United States Patent [19]
Hall

[11] 3,853,763
[45] Dec. 10, 1974

[54] IN-TANK FILTER AND MOUNTING ARRANGEMENT THEREFOR

[75] Inventor: Lowell R. Hall, Manhattan, Ill.

[73] Assignee: Caterpillar Tractor Co., Peoria, Ill.

[22] Filed: July 2, 1973

[21] Appl. No.: 375,354

[52] U.S. Cl. .................. 210/130, 210/172, 210/438, 210/456
[51] Int. Cl. ...................... B01d 35/02, B01d 27/10
[58] Field of Search ........... 210/130, 172, 437, 438, 210/456

[56] References Cited
UNITED STATES PATENTS
| | | | |
|---|---|---|---|
| 2,242,807 | 5/1941 | Austin | 210/456 X |
| 3,422,956 | 1/1969 | Hadden | 210/130 X |
| 3,572,508 | 3/1971 | Rice | 210/172 X |
| 3,750,888 | 8/1973 | Rinaldo | 210/172 |

*Primary Examiner*—Frank A. Spear, Jr.
*Attorney, Agent, or Firm*—Martin Majestic

[57] ABSTRACT

A filter is provided of generally cylindrical, hollow body configuration and having a flanged upper end and a bypass valve on the opposite end for relieving overpressure and preventing filter damage. The filter is provided with an in-tank mounting arrangement in the form of a basin-shaped bracket with provision for mounting the filter through an opening therein. Location of the fluid inlet so as to be offset from the filter allows removal through a plate-covered opening in the tank wall. A chute in line with the inlet serves to dissipate fluid velocity, and directs fluid from the inlet to the filter.

6 Claims, 2 Drawing Figures

PATENTED DEC 10 1974 3,853,763

IN-TANK FILTER AND MOUNTING ARRANGEMENT THEREFOR

BACKGROUND OF THE INVENTION

This invention relates to an in-tank fluid filter and mounting arrangement therefor. More particularly this invention relates to a self-contained filter that is used in a tank and having a mounting arrangement such that the filter may be easily replaced by demounting a removable cover obturating an opening in the tank. While the following discussion concerns lubricant fluid and filters, it is to be understood that other fluids, e.g., fuel, are also contemplated as being within the ambit of this invention.

Previously, in-tank filter mounting arrangements have been extremely complex with numerous components, many of which were made of expensive castings which increase the overall cost of the vehicle. Examples are shown in U.S. Pat. Nos. 3,572,508 and 3,524,550 both assigned to applicant's assignee. In addition, the previous mounting arrangements for in-tank filters having external inlets have had the inlets and their associated return lines disposed in alignment with the filter so that the return line had to be removed in order to replace the filter element. Consequently, the otherwise routine task of replacing the filter is much harder and more time-consuming than necessary. Also, removal of the return line disturbs an additional sealed surface which contributes to the possibility of a leak occurring after the filter change. Furthermore, the periodic disconnection of the return line normally makes it necessary to use a flexible conduit which is more susceptible to failure than a rigid conduit. Complexity of previous mounting arrangements has also required additional steps such as unbolting the filter from its mount. Also, previous mounting arrangements sometimes direct incoming fluid onto the filter element at too high a velocity to enable effective filtration of the fluid and may in fact rupture the filter element.

It is to overcoming these and other disadvantages that this invention is directed.

SUMMARY OF THE INVENTION

The invention takes the form of a filter and mounting arrangement wherein the filter is disposed through an opening in a mounting bracket having a basin in a tank and accessible through a removable plate on the tank. A spring located intermediate the plate in its secured position and the filter holds it in operative position within the tank. A return line axially offset from the filter and plate to permit easy removal thereof directs fluid onto a chute portion of the bracket so as to at least partially dissipate its velocity and reduce aeration and subsequent agitation of the fluid on entering the filter. Overpressure of the filter is relieved by a spring-biased bypass valve located on the filter end.

DETAILED DESCRIPTION OF THE PREFERRED EMBODIMENT

Figure 1:
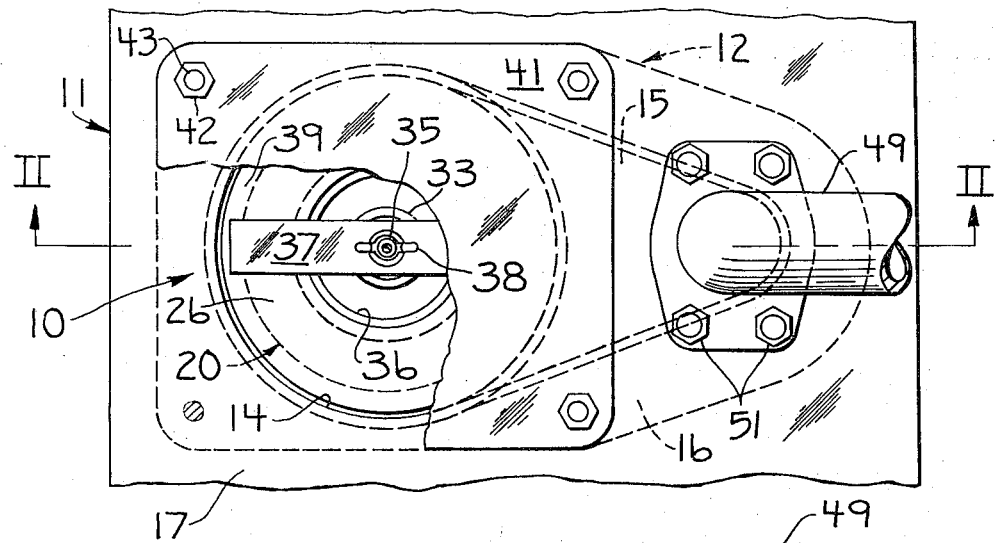
FIG. 1 is a top plan view, partially cut away, of a filter shown mounted in a tank.
Figure 2:
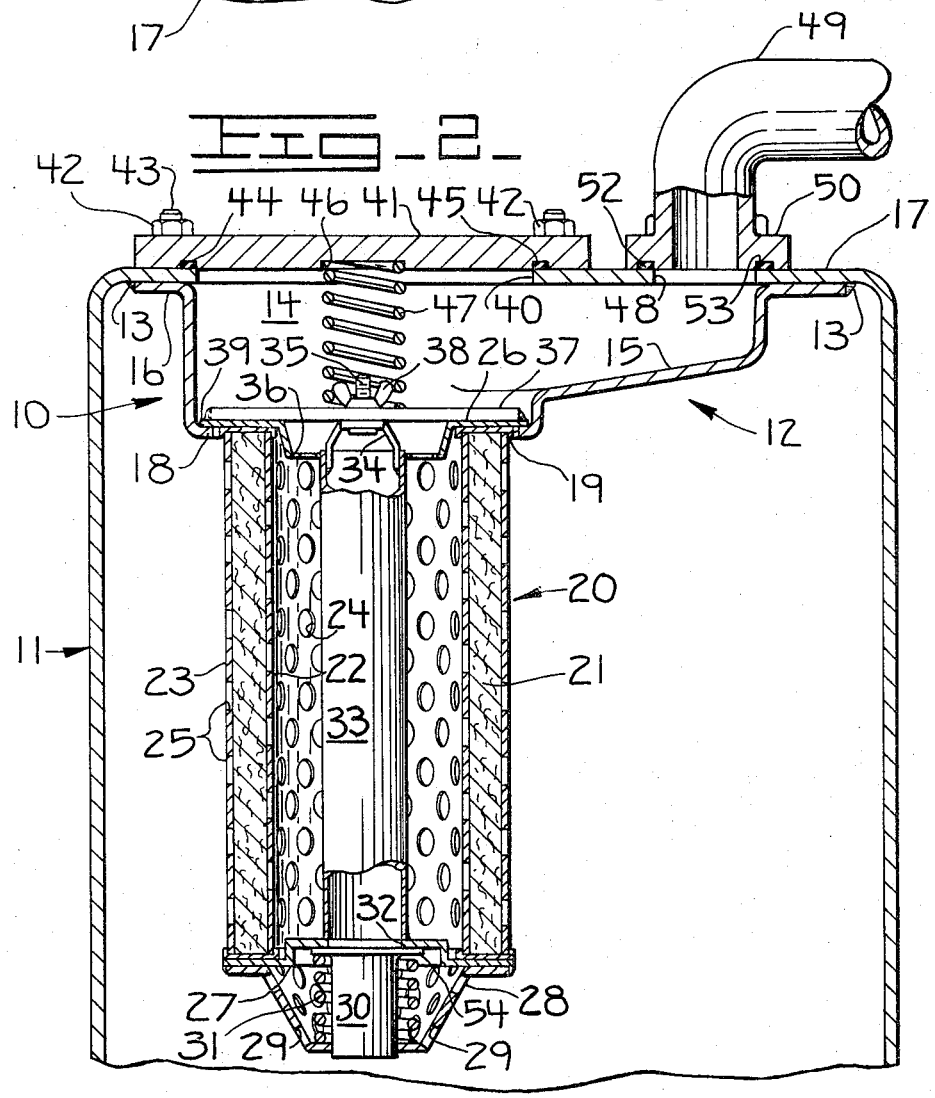
FIG. 2 is a side elevation view of the same in partial cross section showing details thereof.

Referring to FIGS. 1 and 2 in the drawing, a filter mounting arrangement is generally indicated by reference numeral 10 disposed within a fluid retaining tank partially shown at 11. The mounting arrangement includes a mounting bracket 12 having a diffuser basin 14 and an offset chute 15 communicating therewith. The upper end of the mounting bracket has an outwardly extending flange 16 abutting the top wall 17 of the tank 11 and is welded or otherwise secured thereto around its periphery 13. An inwardly extending flange 18 is provided about the periphery of the circular opening 19 formed through the bottom of the basin 14.

A filter assembly shown generally at 20 is disposed through the opening 19. The filter assembly includes a replaceable hollow cylindrically shaped filter element 21 encased between inner and outer concentric cylindrical sleeves 22 and 23, having a plurality of perforations 24,25, respectively. The opposite ends of the filter element are contained between opposite upper and lower circular end plates 26 and 27, respectively. Attached to the lower end plate is a frustoconical baffle 28 having perforations 29 therein and an opening in the end thereof. A generally cylindrical bypass valve 30 is contained within the baffle such that an end of said bypass valve extends through the opening in the end thereof in closely fitted relation thereto. The valve assembly is normally urged upwardly by a spring 31 to block the passage of fluid through a centrally disposed opening 32 formed in the end plate 27. A vertically disposed thin-walled tube 33 concentrically within sleeves 22,23 has its lower end attached to the lower end plate 27 about the periphery of the opening 32. The upper end of the tube is disposed adjacent the upper end of the filter assembly 20 and has an upstanding bracket 34 attached thereto. The bracket is provided with a threaded stud 35 extending upwardly therefrom and fixedly secured thereto. The upper end plate 26 is provided with a centrally disposed circular opening 36 for admitting fluid from the basin 14 into the filter assembly 20. An elongated strip 37 is fixedly attached atop the upper end plate 26 and extends across the opening 36. The filter assembly 20 is fastened together by a wing nut 38 screw-threadedly mounted on the stud 35 which is disposed through the strip 37. The filter assembly is supported by the mounting bracket 12 by the engagement of the outer peripheral flange 39 of the upper end plate 26 with the inwardly extending flange 18.

A circular opening 40 is formed in the top wall 17 of the tank in alignment with the filter assembly 20 to permit its removal therethrough. A cover plate 41 is normally secured over the opening 40 by fasteners, such as nuts 42 which are screw-threadedly secured on a plurality of studs 43 attached to the top wall of the tank. An annular seal member 44 is disposed within an annular groove 45 formed in the cover plate 41 about the periphery of the opening 40 for sealing purposes. The cover plate 41 is also provided with an annular recess 46 formed in its lower side for mounting a spring 47 therein. The lower end of the spring engages the strip 37 and is held in biasing relation by cover plate 41 in order to prevent the upward movement of the filter assembly 20 during operation.

An offset inlet opening 48 is formed in the top wall 17 of the tank 11 in alignment with the chute 15 of the mounting bracket 12. A nonflexible return line 49 having a flange 50 is mounted over the inlet opening 48 by a plurality of fasteners 51. An annular seal 52 is disposed within an annular groove 53 formed in the flange 50 about the periphery of the opening for sealing purposes.

In operation, lubricant fluid, such as oil from a lubricant circuit, not shown, is conducted to the filter by the return line 49. Fluid being expelled from the return line, sometimes at relatively high velocities, is discharged against the chute 15 of the bracket 12. The chute diffuses the fluid into the basin 14 to slow its velocity before its entrance through the opening 36 in the upper end plate 26 into the hollow filter assembly 20. Fluid enters the filter element 21 through the perforations in the inner cylindrical sleeve 22 and emerges filtered through the perforations in the outer cylindrical sleeve 23.

If periodic replacement of the filter element is neglected, causing a build up of pressure within the filter assembly because of clogging, the fluid pressure will cause the opening of the bypass valve element 30 against the closing force of the spring 31 bearing against flange 54 on bypass valve element 30. Consequently, unfiltered fluid is channeled through the tube 33 and admitted to the tank 11 through the bypass valve 30 and the perforations 29 in baffle 28.

It is to be understood that the foregoing description is merely illustrative of preferred embodiments of the invention and that the scope of the invention is not to be limited thereto, but is to be determined by the scope of the appended claims.

What is claimed is:

1. A filter assembly comprising,
   a generally cylindrical outer case member,
   a generally cylindrical inner case member concentrically disposed within and spaced from said outer case member,
   filter material intermediate said inner and outer case members,
   a plurality of perforations in said inner and outer case members for passage of fluid therethrough,
   upper and lower end plates on upper and lower ends of said case members, respectively,
   said upper end plate defining a flange portion radially outward of said outer case member for use in mounting the filter assembly,
   means defining an opening in said upper end plate for admission of fluid to the filter assembly,
   a tube concentrically disposed within and spaced from said inner case member and defining upper and lower open ends thereof, the upper end of said tube being located adjacent said means defining an opening, and the lower end thereof being fixed to said lower plate,
   means defining an opening through said lower plate so as to give communication between the interior of said tube and the exterior of said filter assembly, and further including bypass valve means normally obturating said means defining an opening through said lower plate, said bypass valve means operating to open communication between said tube interior and filter assembly exterior when a predetermined level of fluid pressure in said tube interior is reached and further operating to close off communication and again obturate said lower plate opening defining means when said fluid pressure drops below said predetermined level,
   said filter assembly further in combination with a tank,
   a bracket within said tank defining a basin,
   means defining an opening in said bracket through which said filter assembly extends, said flange portion of said upper end plate being dimensioned so as to prevent the filter assembly from passing through said bracket,
   an inlet opening located in the top wall of said tank and being offset from said filter assembly,
   a chute formed in said mounting bracket in line with said top wall inlet opening for dissipating fluid velocity and directing fluid to said filter assembly, and further including means for holding said filter assembly in position within said means defining an opening in said bracket.

2. The filter assembly of claim 1 wherein said bypass valve means comprises
   a bypass valve member,
   a generally frustoconical baffle depending from said lower end plate defining at least one perforation therein and an opening in the end thereof through which passes said bypass valve member, and
   spring biasing means intermediate said baffle and said lower end plate for biasing said valve member against said lower end plate so as to close off the opening therein.

3. The filter assembly of claim 1 further including a strip extending across and fixed to said upper end plate and the intermediate portion of which is positioned above the upper end of said tube, and upstanding bracket fixed to said upper end and fastener means fixing said bracket to said strip.

4. The filter assembly of claim 3 wherein said fastener means comprises a stud fixed to said upstanding bracket and extending through said strip and further including a nut threadably engaged on said stud.

5. The combination of claim 1 further including means defining an opening in said tank wall in line with said means defining an opening in said bracket so as to permit removal of said filter assembly from said tank, and means removably securing a cover plate over said means defining an opening in said tank wall.

6. The combination of claim 5 wherein said means for holding said filter assembly in position comprises a spring located intermediate said cover plate and said filter assembly.

* * * * *